July 10, 1951  T. A. HEWSON  2,560,107
AUTOMATIC CHEMICAL TESTING APPARATUS
Filed June 4, 1949  7 Sheets-Sheet 1

July 10, 1951        T. A. HEWSON        2,560,107

AUTOMATIC CHEMICAL TESTING APPARATUS

Filed June 4, 1949              7 Sheets-Sheet 2

INVENTOR.

Thomas A. Hewson.

BY

July 10, 1951 T. A. HEWSON 2,560,107
AUTOMATIC CHEMICAL TESTING APPARATUS
Filed June 4, 1949 7 Sheets-Sheet 7
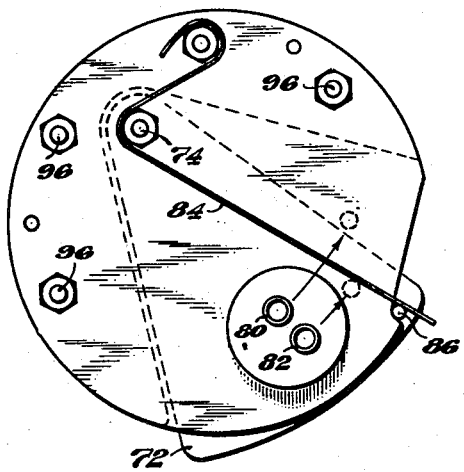
Fig. 11
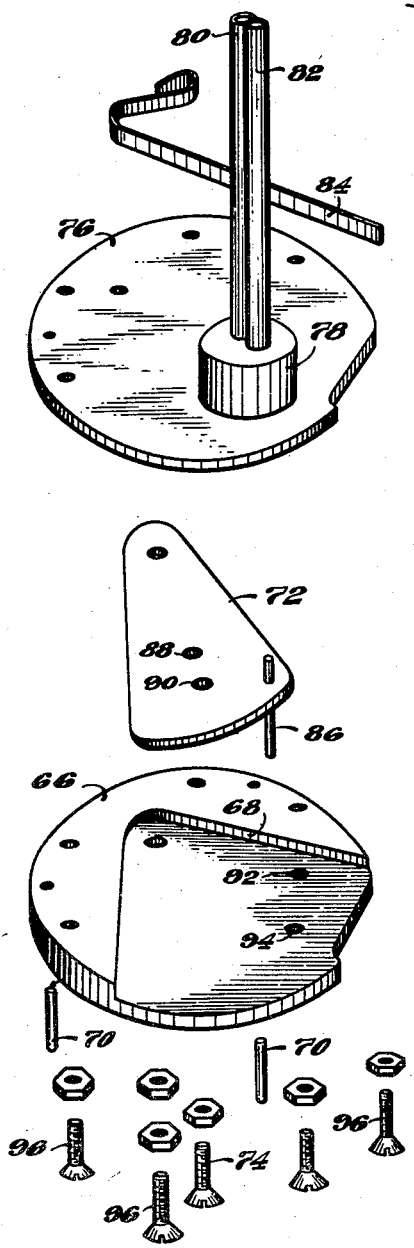
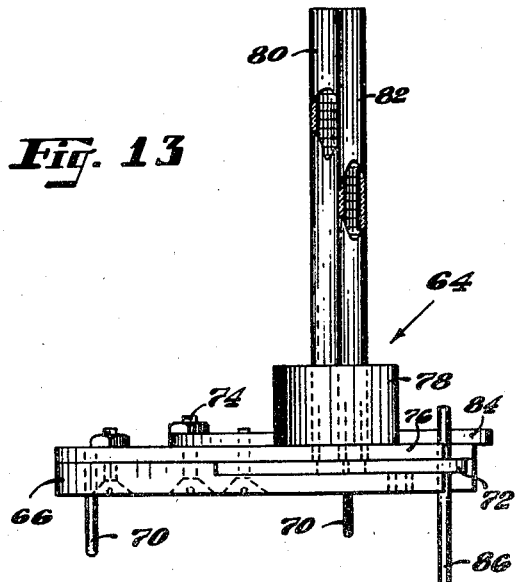
Fig. 13
Fig. 12

Patented July 10, 1951

2,560,107

UNITED STATES PATENT OFFICE 2,560,107

AUTOMATIC CHEMICAL TESTING APPARATUS

Thomas A. Hewson, Dover, Mass., assignor to Lessells and Associates, Inc., Boston, Mass., a corporation of Massachusetts Application June 4, 1949, Serial No. 97,263

8 Claims. (Cl. 23—253)

My invention relates to apparatus for carrying out chemical testing procedures automatically upon a large number of samples or unknowns.

It has been generally customary to conduct chemical tests in laboratories equipped for the purpose, although portable kits have been made available for field use where a small number of tests is desired. To conduct mass clinical examinations for specific symptoms, such for example as blood sugar content, it has been necessary to arrange for patients to visit a laboratory. However, in recent years it has become increasingly important, particularly to public health officials, to conduct examinations of large groups of persons as a preventive measure. For example, mobile X-ray units have become commonplace.

When it is realized that clinical testing of this sort is carried out on putatively healthy persons, it can be seen that one very serious problem presents itself. For effective operation the testing should be carried out in the field and upon relatively large groups of people. Consequently the work has been hampered by the lack of large capacity portable equipment.

It is with the solution of this problem with which my invention deals, and the primary object thereof is to produce portable chemical testing equipment capable of processing large numbers of samples in the minimum time.

Another object of the invention is to effect a drastic reduction in the expense of conducting large numbers of chemical tests and analyses.

A further object of the invention is to provide a large capacity chemical testing unit capable of simple adjustment automatically to perform any one of a variety of test procedures.

Another object of my invention is to provide automatic testing apparatus for carrying out routine laboratory manipulations and thereby free skilled technicians for more important and demanding tasks.

An important feature of my invention resides in the combination of a carrier for test tubes or the like, means for advancing the carrier to move the tubes through a sequence of stations, and processing elements detachably mounted at the stations.

Another feature of the invention comprises a cam or template associated with the carrier in position to engage and tilt the tubes to desired angles of inclination at or between the stations.

A further feature of the invention comprises a tablet dispenser including a magazine for tablets, a slide arranged to remove one tablet from the magazine, and a trigger associated with the dispenser and engaged by an oncoming test tube for actuating the slide.

Another feature of the invention resides in the combination of the cam above mentioned, a pivotally mounted test tube holder, and a receptacle, so arranged as to decant a buoyant precipitate from a test tube.

Still another feature of the invention comprises a storage rack for processed tubes, and an extracting cam cooperating with the tube carrier for removing tubes in sequence after the test and placing them in storage.

These and other objects and features of the invention will best be understood and appreciated from the following detailed description of a preferred embodiment thereof selected for purposes of illustration and shown in the accompanying drawings, in which:

Fig. 11 is a plan view of the double tablet dispenser,

Fig. 12 is a view in side elevation of the double tablet dispenser, and

Fig. 13 is an exploded view in perspective of the double tablet dispenser.

Figure 1:
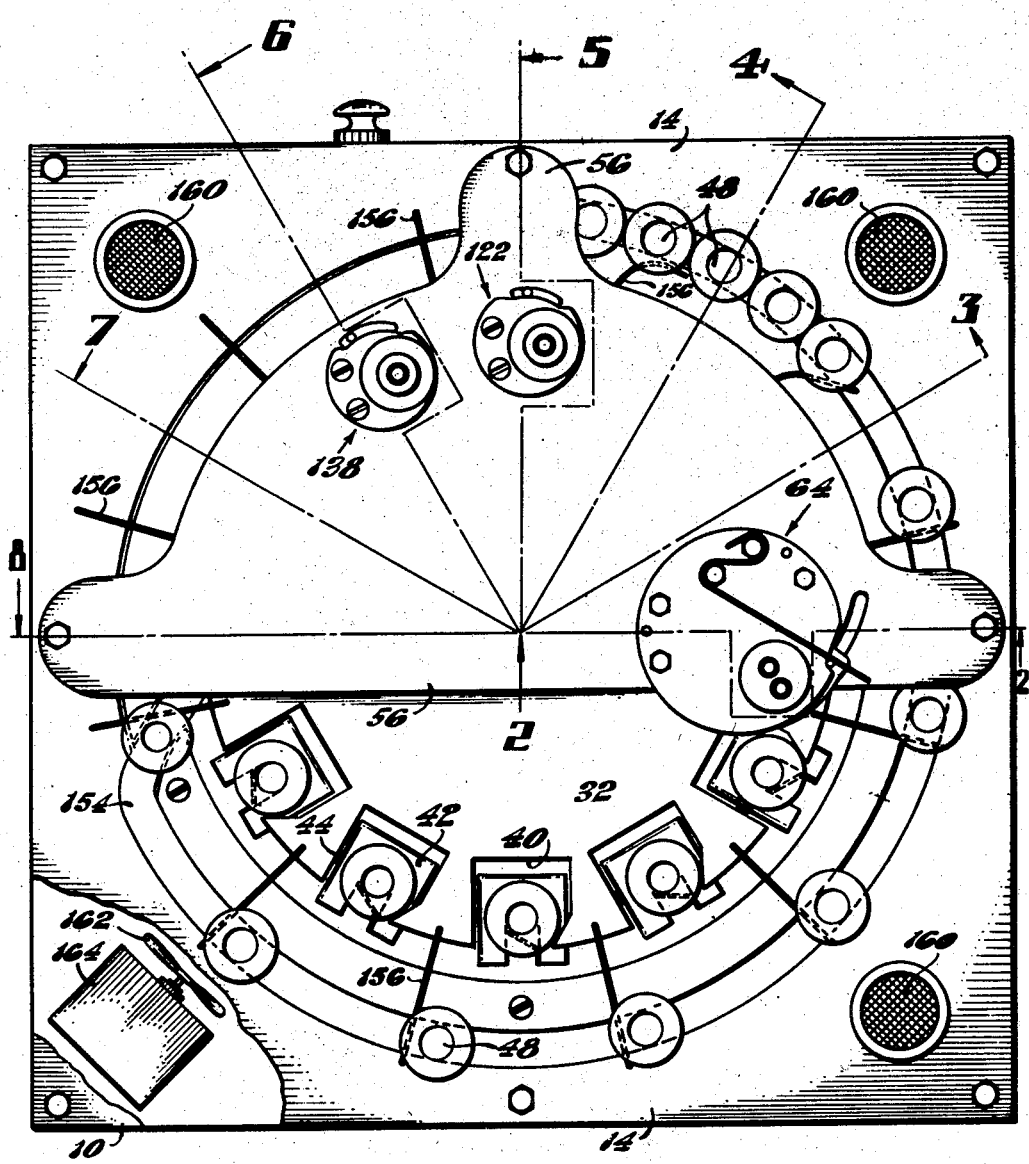
Fig. 1 is a plan view of apparatus constructed in accordance with my invention.

The machine is housed in a rectangular metal casing 10 open at the top and provided with a raised bottom plate 12 provided with a plurality of rigid spacers 16 supporting and securing a top plate 14 having a large opening at its center. These are the elements upon which the machine is constructed.

Before proceeding to a detailed description of the elements which constitute the several mechanisms and features of the apparatus, I shall first present an outline of the organization and functions thereof. A circular carrier plate 32 is provided at its margin with a number of pivotally mounted holders 42 for carrying a plurality of test tubes 48. By means of a Geneva mechanism the carrier is rotated in steps of 30° at intervals of 30 seconds; at seven of the stops or pauses there are provided operating stations, and a cam or template 52 serves to tilt the tubes to desired angles of inclination. The elements at the stations shown are adapted to perform the Wilkerson-Heftmann blood-sugar screening test.

Figure 2:
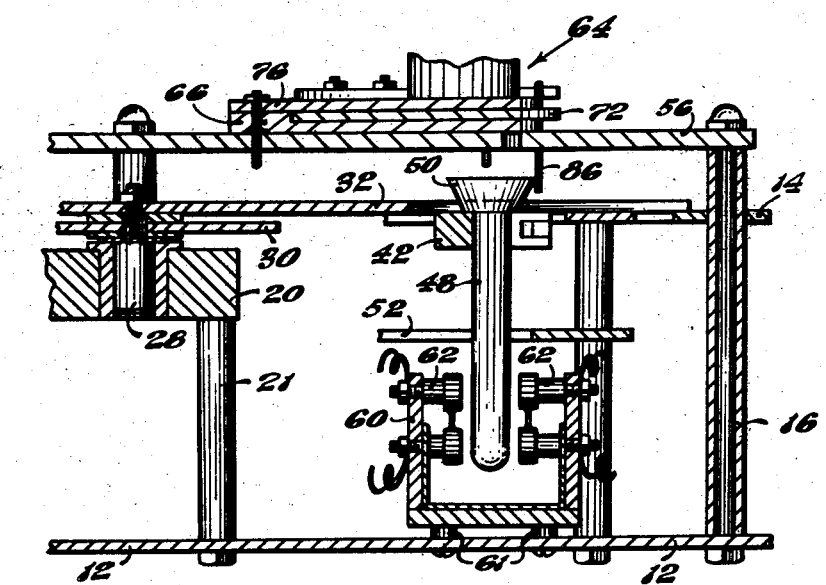
Fig. 2 is a view in cross-section along the line 2—2 of Fig. 1.

As a tube 48 moves into the first station (Fig. 2) it actuates a twin tablet dispenser 64 and receives two reagent tablets, then it stops between two pairs of electric heating coils 62.

As it reaches the second station (Fig. 3) the tube comes to rest between a second battery of heating coils 102. When it approaches the third station (Fig. 4) it meets a projection on the cam 52 which tilts the tube to an angle of 45° to decant a buoyant precipitate 113 into a cup 112 and also poise it between two pairs of heating elements 110.

At the fourth station (Fig. 5) the tube receives a single tablet from a dispenser 122, is tilted to 30°, and juxtaposed to a single pair of heating coils 120. As the tube approaches a fifth station (Fig. 6) it is tilted to 60° to permit it to pass over the wall of a water tank 130, then tilted back to the vertical, receives another tablet from a dispenser 138, and is agitated by motor driven fingers 136. At the next station (Fig. 7) it is tilted to 30°, partially leaving the coolant 132 in the tank 130.

At the seventh station (Fig. 8) the tube 48 steps between a lamp 142 and a photocell 146 where a signal responsive to the transparency of the fluid contents of the tube is sent to a recorder (not shown).

The tube is now completely processed, and at the next movement of the carrier is met by an extracting cam 150 which forces the tube into a circular storage track 154. Processed tubes are stepped along the track 154 by a plurality of weak spring arms 156 projecting outwardly from the carrier 32.

*The carrier mechanism*

Secured to the bottom or base plate 12 is a motor and reducing gear train 18 which drives a vertical shaft 22 journaled adjacent its upper end in a horizontal bracket 20 supported in spaced relation above the bottom 12 by means of a plurality of rigid spaces 21. Keyed on the upper end of the shaft 22 is a disk 24 bearing an upwardly projecting pin 26 disposed to drive a slotted Geneva spider or wheel 30 mounted on a vertical stud 28 journaled in the bracket 20. Fixed for rotation with and above the spider 30 is a large flat circular plate or carrier 32 provided along its margin with twelve open-ended rectangular slots 40 in each of which is contained a U-shaped member 42 mounted on horizontal pivot pins 44 and provided across its mouth with a spring clip 46. The members 42 are dimensioned to accommodate the barrels of test tubes 48 having bell mouths 50. It will be observed that the tubes 48 and their holders 42 may be rocked to vary their inclination from the vertical.

In order to control the angle of inclination of the test tubes 48 I provide a cam or template 52 having the general shape of a crescent but provided on its inner periphery with projections and depressions against which the tubes ride. The cam 52 is disposed parallel to and beneath the carrier and detachably secured in place to permit substitution of cams of different configurations to achieve a variety of cycles of inclination of the tubes 48 as required in different chemical testing processes.

Mounted on rigid spacers 57, above and parallel to the carrier 32 is a generally semi-circular plate 56, preferably of transparent plastic material, on which a variety of processing elements may be detachably mounted.

*Station I (Fig. 2)*

Figure 10:
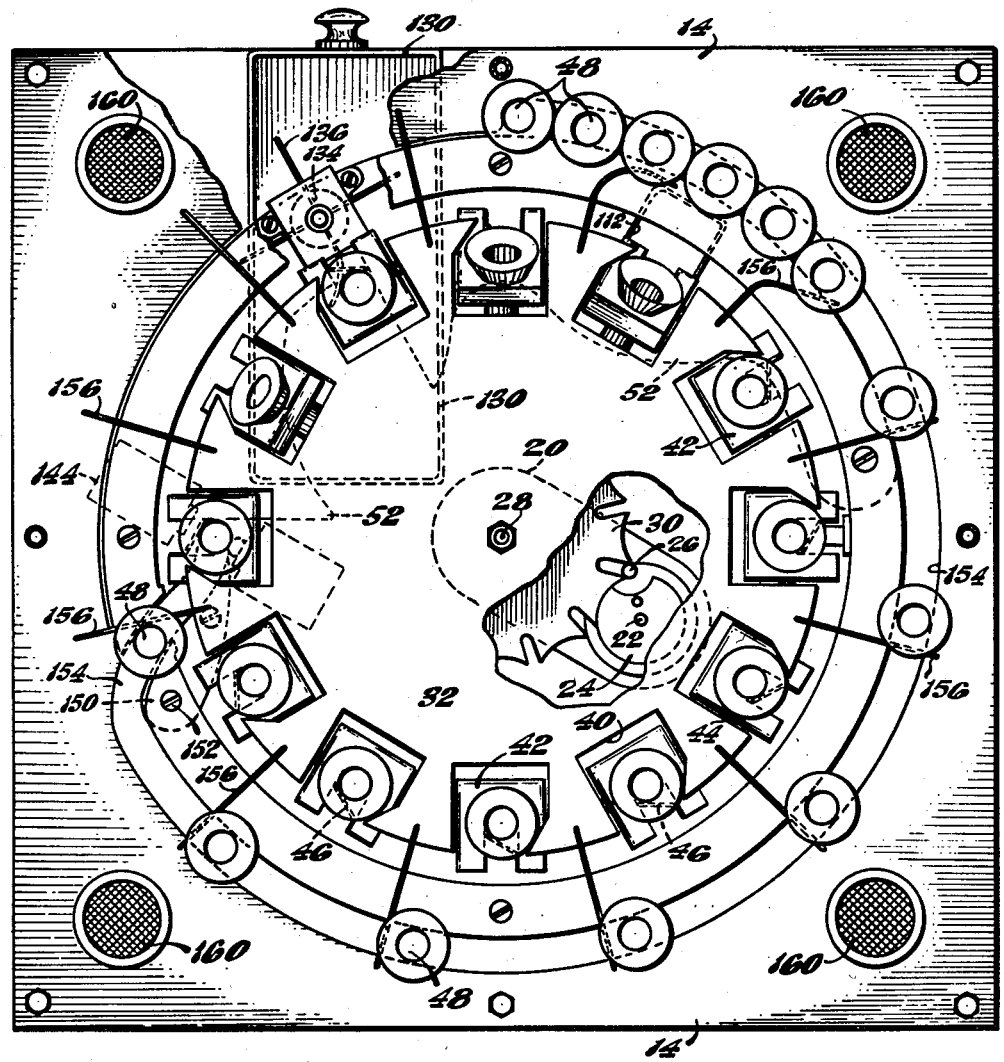
Fig. 10 is a plan view with the element mounting plate removed.

The first station is located at three o'clock on the plan view of Fig. 10. It represents a point at which the carrier stops. For example, the motor speed and Geneva motion may be chosen to move the carrier for 30° of arc during five seconds, rest 25 seconds and repeat continuously. It follows, then, that there will be twelve stations or stops around the periphery of the carrier.

At the first station there is provided an electrical heating unit comprising a U-shaped frame 60 secured to the base 12 by screws and spacers 61, each leg of the U-shaped member having two electrical heating coils 62 secured to its inner surface, the two pairs being in opposed relation. A liquid contained in the tube 48 is thereby subjected to a controlled degree of heat for 25 seconds.

A twin or double reagent tablet dispenser 64 is mounted on the panel 56 in position to drop two reagent tablets into a tube 48 as it comes to rest at the first station. The twin tablet dispenser 64 is shown in detail in Figs 11-13. It comprises a relatively thick bottom disk or plate 66 provided with a wedge-shaped recess 68 or depression in its upper surface. Two pins 70 depend from the disk 66 and serve to plug the dispenser into the panel 56. Mounted in the recess 68 is a small wedge-shaped slide 72 pivoted on a vertical pin 74. Superposed over the bottom plate 66 and the slide 72 is an upper disk 76 bearing a cylindrical lug 78 serving to provide sockets for a pair of open ended glass tubes 80 and 82 which communicate with a pair of holes through the upper disk 76 above the slide 72.

A leaf spring 84 is hooked over the pivot pin 74 and bears at its free end against a pin 86 extending through the slide 72 and serving to urge the slide to the position shown in Fig. 11. The upper and lower disks are united by a plurality of bolts 96. The slide 72 is provided with two holes 88 and 90 which register with the tubes 80 and 82 in the position of Fig. 11. The bottom plate 66 also has a pair of holes 92 and 94 but these are offset from the tubes 80 and 82 and register with the holes 88 and 90 only when the slide 72 is swung against the action of the spring 84.

As a test tube 48 moves into the first station, it meets the depending portion of the pin 86 and swings the slide 72, thus removing two tablets from the tubes 80 and 82 and sweeping them across the surface of the recess 68 in the bottom plate 66. The holes 92 and 94 are so arranged that the slide first uncovers the hole 94, so that a tablet from the tube 82 is first dropped through the hole into the test tube. In the further movement of the slide 72 the hole 92 is uncovered and the tablet from the magazine tube 80 is dropped into the test tube. The slide then returns to the battery.

The tablet dispenser 66 is so located on the panel 56 that the tablets are dropped while the test tube 48 is still in motion just prior to stopping at the first station. Here the blood with the tablets is given a preliminary heating from the coils 62.

The tube 48 is not tilted from the vertical at the first station.

Figure 3:
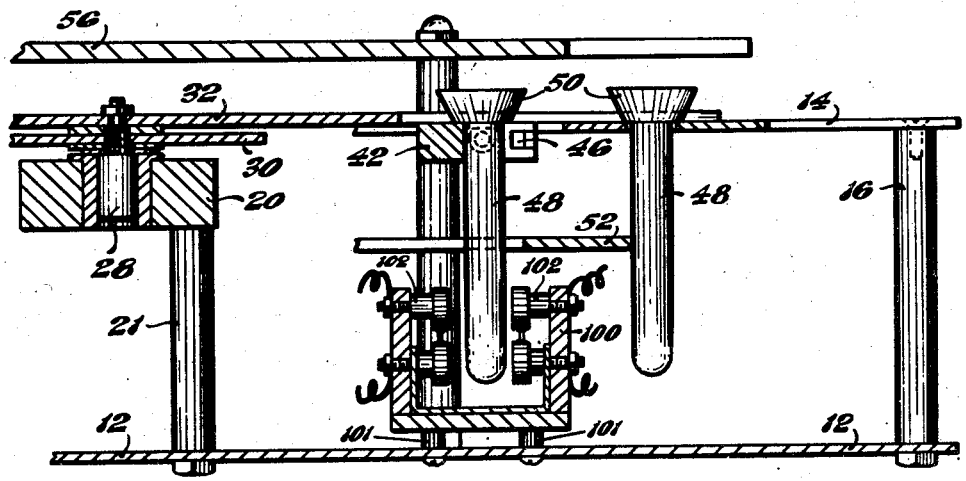
Fig. 3 is a view in cross-section along the line 3—3 of Fig. 1.

Station II (Fig. 3)

At the second station there is a heating element comprising a U-shaped bracket 100 secured to the bottom 12 by means of screws 101 and carrying four electrical heating coils 102 on the inner surfaces of the legs of the U. At this station the tube 48 is given a second heating in vertical position.

Figure 4:
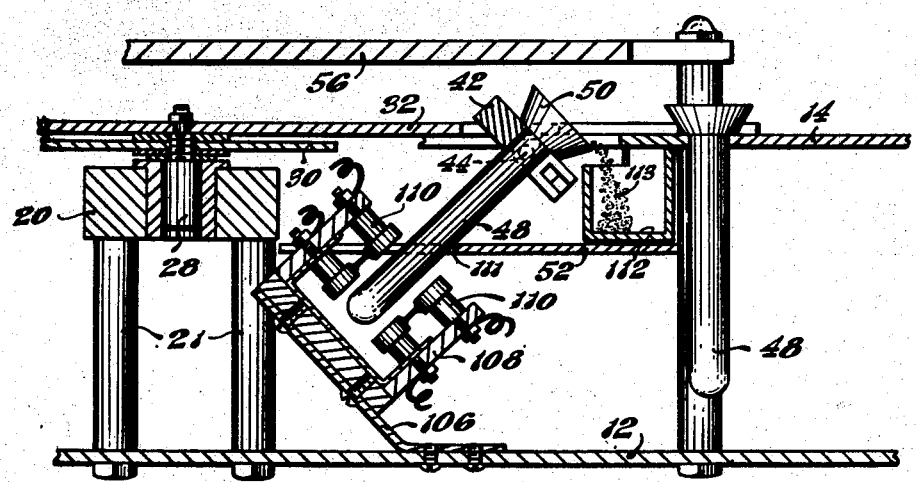
Fig. 4 is a view in cross-section along the line 4—4 of Fig. 1.

Station III (Fig. 4)

At the third station there is provided an inclined bracket 106 secured to the bottom 12 and providing support for a U-shaped member 108 carrying four heating coils 110 on its vertical legs. The tube 48 meets a projection 111 of the cam 52 and is thereby inclined at an angle of approximately 45°. A cup 112 is located beneath the mouth 50 of the test tube 48. In the Wilkerson-Heftmann blood-sugar test the 75 second heating is sufficient to cause the contents of the tube to boil and form a buoyant protein cake precipitate 113 which will rise slowly to the surface and decant out of the tube into the cup 112.

Figure 5:
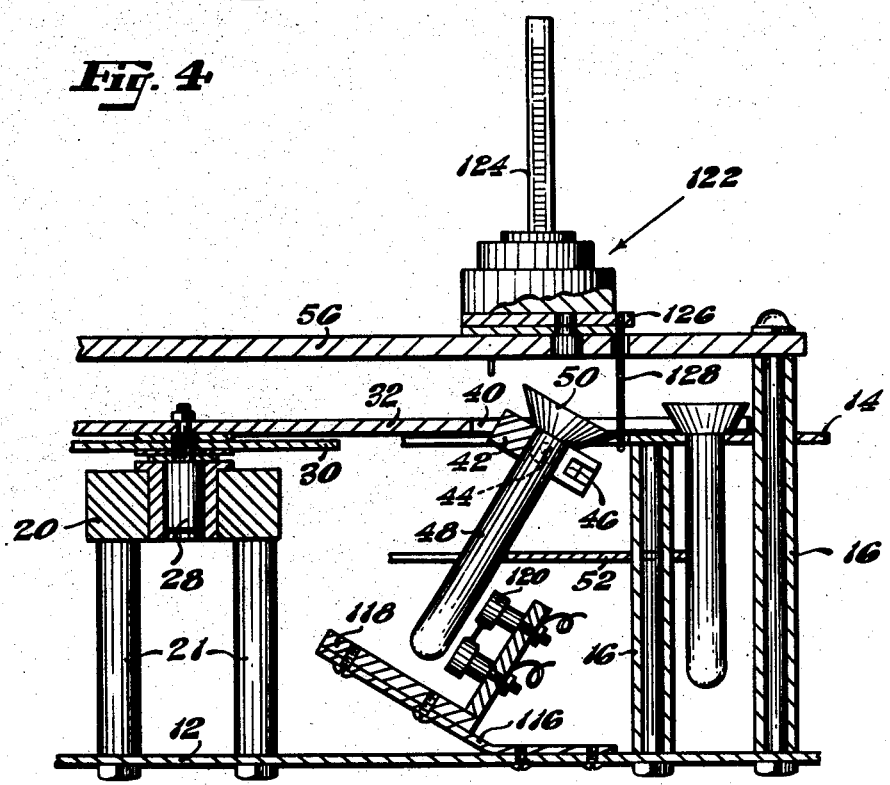
Fig. 5 is a view in cross-section along the line 5—5 of Fig. 1.

Station IV (Fig. 5)

At the fourth station the incoming tube 48 meets and actuates a pin 128 controlling the slide 126 of a single reagent tablet dispenser 122 arranged to remove a tablet from a vertical magazine tube 124 and drop it into the test tube 48. As before, the dispenser is removably plugged into the panel 56. Its details need not be discussed inasmuch as it is constructed on the same principles as the twin dispenser 64.

Secured to the bottom 12 is an inclined bracket 116 supporting an L-shaped member 118 which carries two electrical heating coils 120. The cam 52 is cut to tilt the tube 48 to approximately 30°, or parallel to the face of the coils 120.

Figure 6:
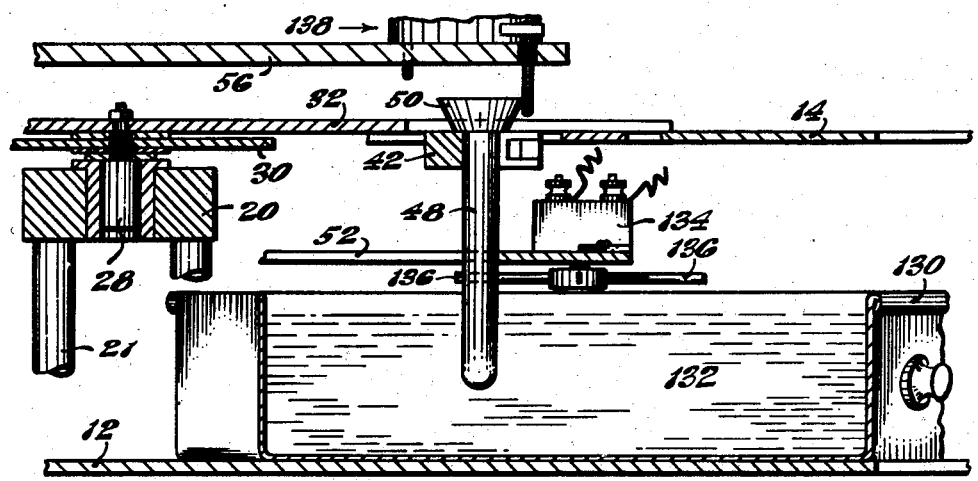
Fig. 6 is a view in cross-section along the line 6—6 of Fig. 1.

Station V (Fig. 6)

At the fifth station there is provided a tank 130 for a coolant 132 such as water. The cam 52 is provided with a projection effective to tilt the incoming tube 48 to clear the rim of the tank; then it returns to vertical position. A single reagent dispenser 138 plugged into the panel 56 is actuated to drop a tablet into the tube. A small motor 134 mounted adjacent the tank 130 drives a disk provided with four spokes or fingers 136 which strike the tube 48 intermittently to agitate it while at the fifth station.

Figure 7:
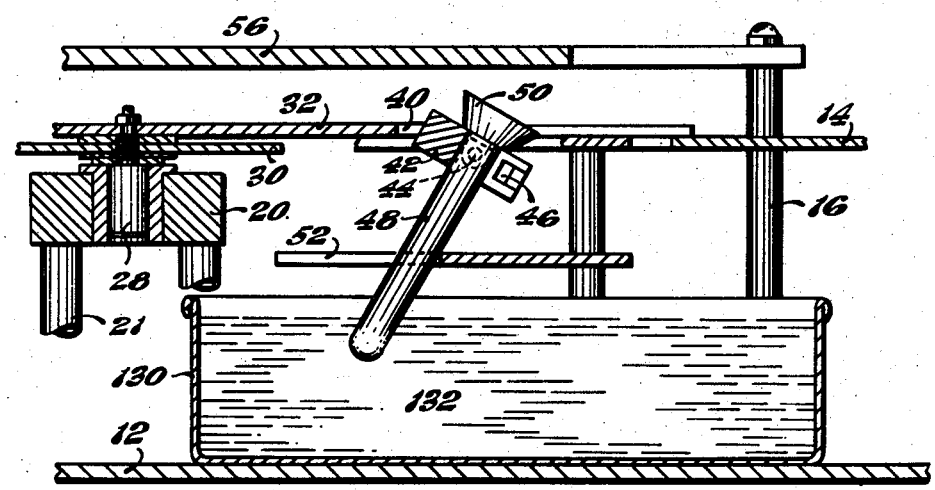
Fig. 7 is a view in cross-section along the line 7—7 of Fig. 1.

Station VI (Fig. 7)

The tank 130 extends to the sixth station where the only change is a partial lifting of the tube from the coolant, effected by a projection on the cam 52 acting to tilt the tube 48 to an angle of approximately 30°.

Figure 8:
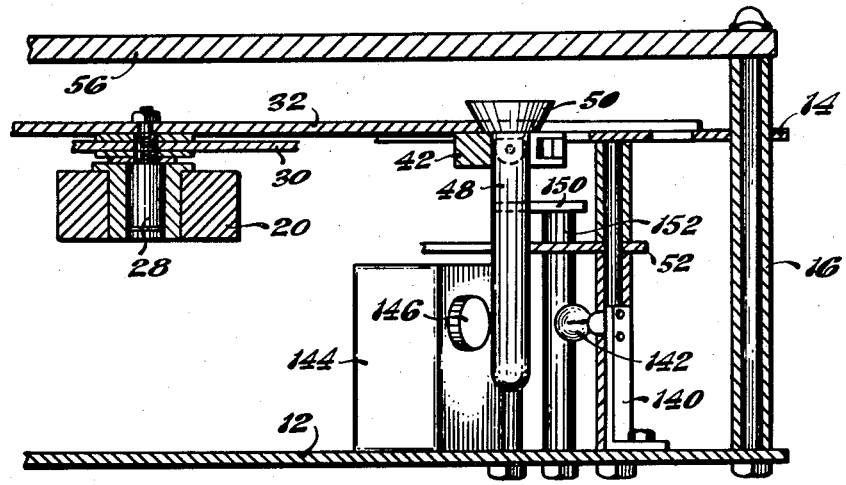
Fig. 8 is a view in cross-section along the line 8—8 of Fig. 1.
Figure 9:
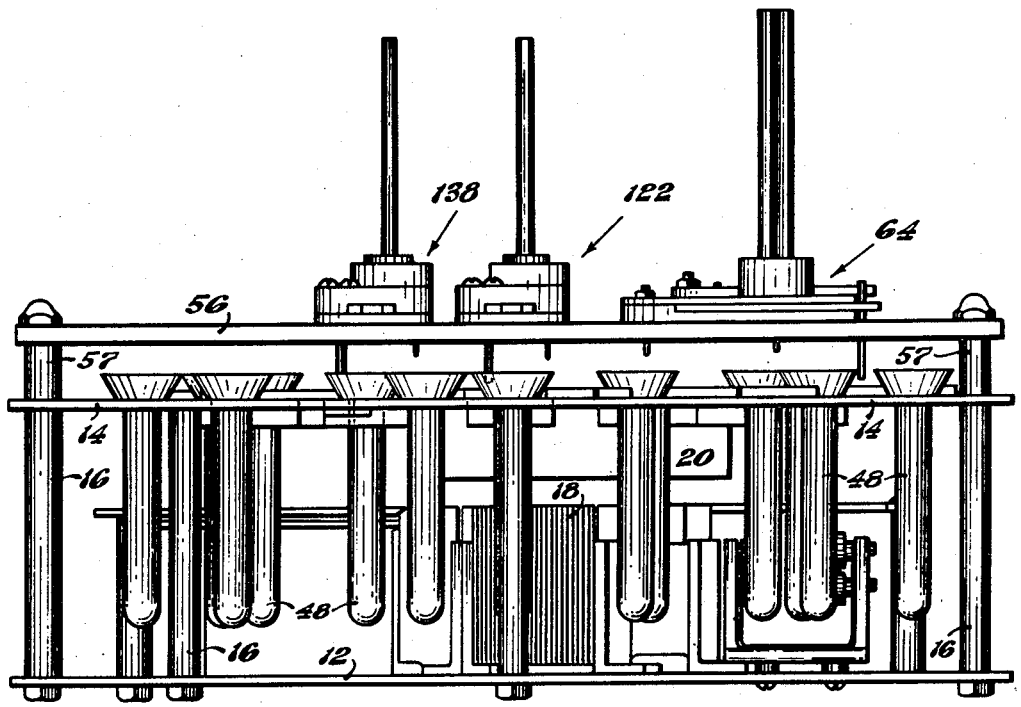
Fig. 9 is a view in side elevation.

Station VII (Fig. 8)

As the tube 48 leaves the sixth station the cam 52 tilts it sufficiently to clear the rim of the tank 130. At the seventh station I provide an upright bracket 140 carrying a small lamp 142. Opposite the lamp 142 is a casing containing a photo-electric cell 146. The tube 48 rests in vertical position between the lamp and the cell.

The photo-electric cell controls circuits operating two relays which in turn operate a recorder. The relays and recorder are not shown because they are standard units known to everyone skilled in the art. Briefly, it may be stated that if no tube 48 is at the seventh station maximum current will flow in the circuit controlled by the cell, both relays will be operated to open the circuits to the recorder and the recorder will not be actuated. If a test tube containing a transparent liquid is poised between the lamp and the cell, the diminution in the current of the relay circuits will be sufficient to actuate one relay and send a pulse to the recorder. If a cloudy opaque liquid is present in the tube 48, both relays are actuated and a different kind of signal transmitted to the recorder.

Of course the tubes are serially numbered and correlated with the names of the patients.

The extractor and storage track

As best shown in Figs. 8 and 10, a pointed cam 150 is mounted on a post 152 in position to intercept test tubes leaving the seventh station. The cam 150 is also located adjacent the mouth of a long circular slot or track 154 cut in the top plate 14 and substantially concentric with the carrier 32. The cam 150 forces the test tube out of the holder 42, against the spring clip 46, and into the track 154. Projecting radially from the carrier periphery between each pair of tube holders 42 is a relatively long weak spring finger 156. By reference to Fig. 10 it may be observed that after a tube has been extracted from its holder 42 by the cam 150, and deposited in the track 154, the next spring finger 156 will sweep it along the track in 30° steps. When the test tube reaches the end of the track or meets the end of a group of tubes crowded at the far end of the track, the spring finger will flex and pass it by.

I have found it desirable to ventilate and cool the interior of the apparatus to protect the motors and cool the processed tubes. Therefore I provide at one corner of the casing 10 a fan 162 driven by a motor 164 and cooperating with four corner vents 160 to force a flow of air through the cased apparatus.

The embodiment of my invention as herein shown and described is set up for the specific purpose of conducting a specific test for blood sugar content. It should be recognized however that many other tests may be performed in similar fashion. In addition to the provision of removable units for heating, cooling, agitating, scanning, and dispensing tablets, I may utilize elements for stirring, triturating, filtering, freezing, mixing, or dispensing liquids in various sequences.

Moreover the apparatus of my invention is by no means limited to medical chemistry but can be usefully employed in production control, compounding, and the like.

Having thus disclosed my invention what I claim as new and desire to secure by Letters Patent of the United States is:

1. Apparatus of the class described, comprising a rotatable carrier, a plurality of test tube holders pivotally mounted upon said carrier approximately equi-distant from the axis of rotation thereof, a plurality of test tubes disposed in said holders, a cam mounted beneath said carrier in position to encounter and tilt oncoming test tubes in said holders as said carrier is rotated, driving means adapted to rotate the carrier through a series of predetermined degrees of rotation, a reagent dispenser mounted above said carrier, means actuated by successive oncoming test tubes for operating said dispenser to discharge reagent into successive test tubes, heating means mounted adjacent the path of oncoming test tubes, cooling means mounted adjacent the path of oncoming test tubes, and an agitator mounted in position to encounter and agitate successive oncoming test tubes.

2. Apparatus of the class described, comprising a rotatable carrier, a plurality of test tube holders pivotally mounted upon said carrier approximately equi-distant from the axis of rotation thereof, a plurality of test tubes disposed in said holders, a cam mounted beneath said carrier in position to encounter and tilt oncoming test tubes in said holders as said carrier is rotated, driving means adapted to rotate the carrier through a series of predetermined degrees of rotation, a reagent dispenser mounted above said carrier, means actuated by successive oncoming test tubes for operating said dispenser to discharge reagent into successive test tubes, heating means mounted adjacent the path of oncoming test tubes, cooling means mounted adjacent the path of oncoming test tubes, an agitator mounted in position to encounter and agitate successive oncoming test tubes, and means for automatically extracting and storing tubes from said holders at the completion of their circuit on the carrier.

3. Apparatus of the class described, comprising a rotatable carrier, a plurality of test tube holders pivotally mounted on a horizontal axis upon said carrier approximately equi-distant from the axis of rotation thereof, a plurality of test tubes disposed in said holders, a cam rigidly mounted beneath said carrier in position to encounter and tilt oncoming test tubes in said holders as said carrier is rotated, driving means adapted to rotate the carrier through a series of predetermined degrees of rotation, a reagent dispenser mounted above said carrier, means actuated by successive oncoming test tubes for operating said dispenser to discharge reagent into successive test tubes, heating means mounted adjacent the path of oncoming test tubes, cooling means mounted adjacent the path of oncoming test tubes, and an agitator mounted in position to encounter and agitate successive oncoming test tubes.

4. Apparatus of the class described, comprising a rotatable carrier, a plurality of test tube holders pivotally mounted upon said carrier approximately equi-distant from the axis of rotation thereof, a plurality of test tubes disposed in said holders, a cam mounted beneath said carrier in position to encounter and tilt oncoming test tubes in said holders as said carrier is rotated, driving means adapted to rotate the carrier through a series of predetermined degrees of rotation with a pause interval between each move, a reagent dispenser mounted above said carrier and disposed at a pause point above that at which the tubes in the holders periodically pause, means actuated by successive oncoming test tubes for operating said dispenser to discharge reagent into successive test tubes, heating means mounted adjacent the path of oncoming test tubes, cooling means mounted adjacent the path of oncoming test tubes, and an agitator mounted in position to encounter and agitate successive oncoming test tubes.

5. Apparatus of the class described, comprising a rotatable carrier, a plurality of test tube holders pivotally mounted on a horizontal axis upon said carrier approximately equi-distant from the axis of rotation thereof, a plurality of test tubes disposed in said holders, a cam rigidly mounted beneath said carrier in position to encounter and tilt oncoming test tubes in said holders as said carrier is rotated, driving means adapted to rotate the carrier through a series of predetermined degrees of rotation with a pause interval between each move, a reagent dispenser mounted above said carrier and disposed at a pause point above that at which the tubes in the holders periodically pause, means actuated by successive oncoming test tubes for operating said dispenser to discharge reagent into successive test tubes, heating means mounted adjacent the path of oncoming test tubes at at least one of the pause points, cooling means mounted adjacent the path of oncoming test tubes at at least one of the pause points, and an agitator mounted in position to encounter and agitate successive oncoming test tubes.

6. Apparatus of the class described, comprising a rotatable carrier, a plurality of test tube holders pivotally mounted on a horizontal axis upon said carrier approximately equi-distant from the axis of rotation thereof, a plurality of test tubes disposed in said holders, a cam rigidly mounted beneath said carrier in position to encounter and tilt oncoming test tubes in said holders as said carrier is rotated, driving means adapted to rotate the carrier through a series of predetermined degrees of rotation, a reagent dispenser mounted above said carrier, means actuated by successive oncoming test tubes for operating said dispenser to discharge reagent into successive test tubes, heating means mounted adjacent the path of oncoming test tubes, cooling means mounted adjacent the path of oncoming test tubes, an agitator mounted in position to encounter and agitate successive oncoming test tubes, and means for automatically extracting and storing tubes from said holders at the completion of their circuit on the carrier.

7. Apparatus of the class described, comprising a rotatable carrier, a plurality of test tube holders pivotally mounted on a horizontal axis upon said carrier approximately equi-distant from the axis of rotation thereof, a plurality of test tubes disposed in said holders, a cam rigidly mounted beneath said carrier in position to encounter and tilt oncoming test tubes in said holders as said carrier is rotated, driving means adapted to rotate the carrier through a series of predetermined degrees of rotation with a pause interval between each move, a reagent dispenser mounted above said carrier and disposed at a pause point above that at which the tubes in the holders periodically pause, means actuated by successive oncoming test tubes for operating said dispenser to discharge reagent into successive test tubes, heating means mounted adjacent the path of oncoming test tubes, cooling means mounted adjacent the path of oncoming test tubes, an agitator mounted in position to encounter and agitate successive oncoming test tubes, and means for automatically extracting and storing tubes from said holders at the completion of their circuit on the carrier.

8. Apparatus of the class described, comprising a rotatable carrier, a plurality of test tube holders pivotally mounted on a horizontal axis upon said carrier approximately equi-distant from the axis of rotation thereof, a plurality of test tubes disposed in said holders, a cam rigidly mounted beneath said carrier in position to encounter and tilt oncoming test tubes in said holders as said carrier is rotated, driving means adapted to rotate the carrier through a series of predetermined degrees of rotation with a pause interval between each move, a reagent dispenser mounted above said carrier and disposed at a pause point above that at which the tubes in the holders periodically pause, means actuated by successive oncoming test tubes for operating said dispenser to discharge reagent into successive test tubes, heating means mounted adjacent the path of oncoming test tubes at at least one of the pause points, cooling means mounted adjacent the path of oncoming test tubes at at least one of the pause points, an agitator mounted in position to encounter and agitate successive oncoming test tubes, and means for automatically extracting and storing tubes from said holders at the completion of their circuit on the carrier.

THOMAS A. HEWSON.

REFERENCES CITED

The following references are of record in the file of this patent:

UNITED STATES PATENTS

| Number | Name | Date |
|---|---|---|
| 978,644 | Raabe | Dec. 13, 1910 |
| 1,431,161 | Juer | Oct. 10, 1922 |
| 1,794,222 | Whitney | Feb. 24, 1931 |

FOREIGN PATENTS

| Number | Country | Date |
|---|---|---|
| 21,313 | Great Britain | Sept. 16, 1912 |